April 26, 1966 R. J. TOLMIE 3,248,631
CONTROL SYSTEM WITH PLURAL VOLTAGE SOURCES FOR A D.C. MOTOR
Filed May 24, 1963

INVENTOR.
ROBERT J. TOLMIE
BY
A. J. De Angelis
ATTORNEY

United States Patent Office 3,248,631
Patented Apr. 26, 1966

3,248,631
CONTROL SYSTEM WITH PLURAL VOLTAGE
SOURCES FOR A D.C. MOTOR
Robert J. Tolmie, Fairfield, Conn., assignor to Sperry
Rand Corporation, New York, N.Y., a corporation of
Delaware
Filed May 24, 1963, Ser. No. 283,036
1 Claim. (Cl. 318—442)

The invention relates to electrical power and control mechanisms for electrical appliances and especially to such mechanisms for appliances of relatively small size, weight and capacity adapted for energization from an external alternating power source, and is a continuation-in-part of my copending application Serial Number 257,190, filed February 8, 1963, now abandoned.

Small appliances, such as electric dry shaver apparatus, having a driving motor and means for converting alternating power from an external source to unidirectional power at a predetermined voltage magnitude for energization of the driving motor, are already well-known in the art. With the advent of world-wide distribution of such small appliances, it has become desirable to provide a universal appliance equipped with electrical circuitry which permits proper operation in a variety of locales, notwithstanding that at such locales the alternating power available may differ in voltage magnitude.

It is, therefore, an object of this invention to provide for such small electrical appliances improved electrical power and control mechanism permitting selective energization of the appliance from external alternating power sources of differing voltage magnitudes.

Another object is to provide such an electrical power and control mechanism which is of simple, economical design and utilizes presently available standard circuit components.

The invention involves providing in an electrical appliance voltage limiting means selectively operable for limiting the voltage magnitude of the alternating power applied to the appliance to a predetermined level for proper operation of the appliance without substantially increasing the power consumption of the appliance.

In carrying out the invention, according to a preferred embodiment, variable reactive impedance means are provided in the alternating power input circuit of an electrical appliance. The impedance means are manually settable to limit the magnitude of the applied alternating voltage to a predetermined level for proper operation of the appliance.

Features and advantages of the invention will be seen from the above and from the following description of operation when considered in conjunction with the drawing and from the appended claim.

Figure 1:
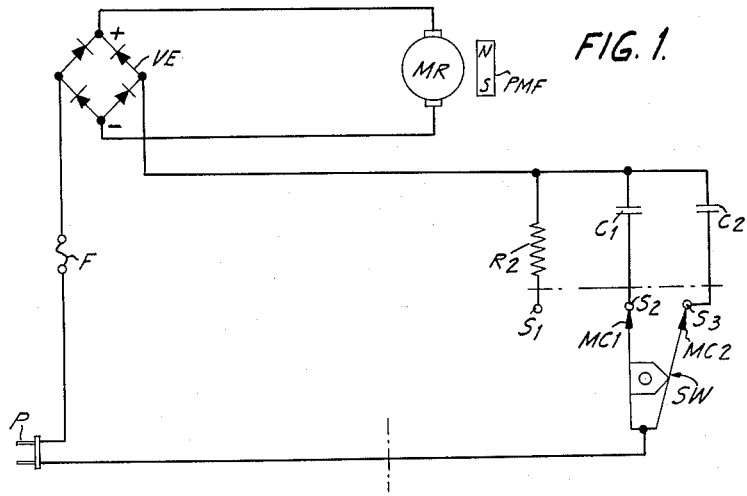
FIG. 1 is a simplified schematic wiring diagram of an electrical power and control mechanism for an electric motor driven appliance, having means for converting alternating power supplied at various voltage magnitudes to unidirectional power at a predetermined voltage magnitude.

Referring to FIG. 1, wherein a preferred embodiment of the subject invention is illustrated, MR designates the rotor of a direct current driving motor of a small appliance, such as a dry shaver, and PMF designates its permanent magnet field. P designates a male electrical plug adapted for connection to a source of alternating power (not shown), such as, for example, as is available from a standard household alternating power female outlet. F designates a fuse, while VE designates a full wave bridge type rectifier for converting the applied alternating power to unidirectional power for energization of motor rotor MR.

SW designates a three position manual switch, having three stationary contacts, designated S1, S2 and S3, and two electrically interconnected, movable contacts, designated MC1 and MC2. R2 designates a current limiting resistor, while C1 and C2 designate capacitors; the circuit components being electrically interconnected in the shaver circuit as shown.

To illustrate the operation of the subject mechanism, assume that it is desired to operate the shaver driving motor from any one of three different external alternating power sources which supply alternating power at, say, for example, 127 volts, 160 volts and 220 volts, respectively, at a frequency of 50 cycles per second as is supplied in certain parts of Europe. Under such conditions, for one tested embodiment of the invention, satisfactory operation was obtained with resistor R2 at 180 ohms, capacitor C1 at .85 mf. and capacitor C2 at .45 mf.

Assume that it is desired to connect male plug P to such an alternating current outlet (not shown), supplying power at 160 volts. Under such circumstances, manual switch SW is actuated to the condition shown in FIG. 1, engaging its movable contacts MC1, MC2 to its stationary contacts S2, S3, respectively, thereby connecting capacitors C1 and C2 in parallel in the power input circuit. Plug P is then connected to the 160 volt alternating power source, applying alternating power to rectifier VE through capacitors C1 and C2. Capacitors C1 and C2 are selected of such capacitive value as to provide sufficient reactive impedance to current flow to effectively limit the magnitude of the voltage applied to the input of rectifier VE to approximately a desired 110 volts.

Figure 2:
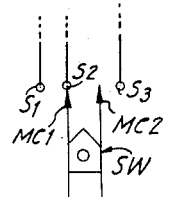
FIG. 2 is a schematic representation of the manual switch SW of FIG. 1, showing the switch in an operating condition different from that of FIG. 1.

Next assume that it is desired to energize the shaver motor from an external alternating power source of 220 volt magnitude. Under such conditions, switch SW is manually actuated to the condition shown in FIG. 2, removing its movable contact MC2 from in engagement with stationary contact S3, thereby disconnecting capacitor C2 from the input circuit, and leaving capacitor C1 in series with the input to rectifier VE. Such disconnection of capacitor C2 increases the reactive impedance in the shaver input circuit to a value which is predetermined to limit the alternating voltage applied to rectifier VE to approximately 110 volts, thereby providing proper energization of motor rotor MR, notwithstanding the increased magnitude of the applied alternating voltage.

Figure 3:
FIG. 3 is a view similar to that of FIG. 2, showing switch SW in a third operating condition.

Next assume that it is desired to operate the shaver from a 127 volt source of alternating power. Under such conditions switch SW is actuated to its condition shown in FIG. 3, removing its movable contact MC1 from in engagement with stationary contact S2 and placing its movable contact MC1 into engagement with its stationary contact S1. This removes capacitor C1 from the input circuit and connects resistor R2 in series with rectifier VE to reduce the voltage magnitude applied to rectifier VE to approximately 110 volts.

It may be noted that, although in the preferred embodiment only two capacitors are illustrated as being arranged for parallel connection by means of switch SW, three or more capacitors may be similarly arranged, or, alternately, a variable capacitor may be substituted therefore to limit the magnitude of the applied alternating voltage to a predetermiend level for proper energization of the appliance from alternating sources at voltage magnitudes other than 160 volts and 220 volts.

Figure 4:
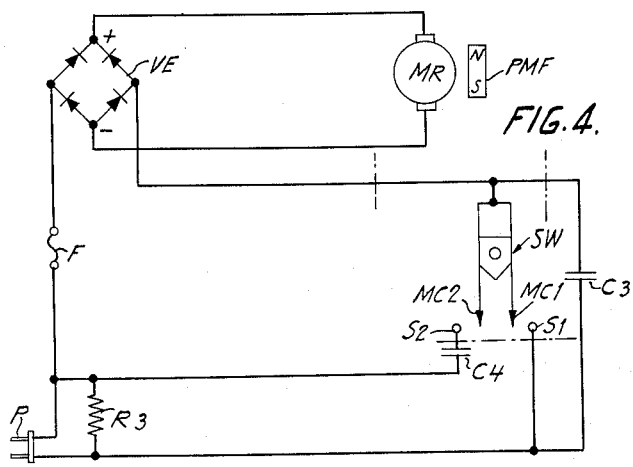
FIG. 4 is a simplified schematic wiring diagram of a slightly modified version of the electrical power and control mechanism of FIG. 1; like circuit components in both wiring diagrams bearing the same identifying designations.

Alternately, the two capacitors may be connected in the shaver input circuit in the manner illustrated by capacitors C3 and C4 in the modified embodiment of FIG. 4. In one tested arrangement of such embodiment, satisfactory operation of the shaver driving motor was obtained (for the aforementioned alternating power supply voltages of 127, 160 and 220 volts at 50 cycles) with capacitor C3 at 1.6 microfarads, capacitor C4 at 1.3 microfarads and resistor R3 at 1 megohm; the latter being provided across the input terminals of male plug P to provide a discharge path for the capacitors when plug P is disconnected from the alternating power source (not shown). The three position manual switch SW has two stationary contacts S1, S2 and two electrically interconnected movable contacts MC1 and MC2.

Assume that male plug P is connected to an alternating current power outlet (not shown), supplying power at 160 volts. Under such circumstances, manual switch SW is actuated to the condition shown in FIG. 4, such that alternating power at 160 volts is applied to rectifier VE through capacitor C3. Capacitor C3 is selected of a value to provide sufficient reactive impedance to current flow to effectively limit the magnitude of the voltage supplied to the input of rectifier VE to approximately a desired 110 volts.

Figure 5:
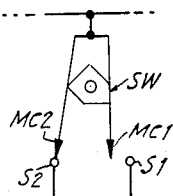
FIG. 5 is a schematic representation of the manual switch SW of FIG. 4, showing the switch in an operating condition different from that of FIG. 4.

Next assume that it is desired to energize the shaver motor from an external alternating power source of 220 volt magnitude. Under such conditions, switch SW is manually actuated to the condition shown in FIG. 5, placing its movable contact MC2 into engagement with its stationary contact S2, thereby placing capacitor C4 (FIG. 4) across the input of rectifier VE while maintaining capacitor C3 in series with one input terminal of rectifier VE. With capacitors C3 and C4 thus both connected in the shaver input circuit, the reactive impedance is increased to a value which is predetermined to limit the alternating voltage applied to rectifier VE to approximately 110 volts, thereby providing proper energization of motor rotor MR notwithstanding the assumed 60 volt increase in the magnitude of the applied alternating voltage.

Figure 6:
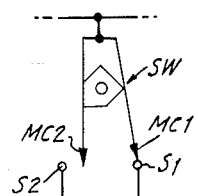
FIG. 6 is a view similar to that of FIG. 5, showing switch SW in a third operating condition.

Next assume that it is desired to operate the shaver from a 127 volt source of alternating power. Under such conditions, switch SW is actuated to its condition shown in FIG. 6, removing its movable contact MC2 from in engagement with its stationary contact S2, thereby disconnecting capacitor C4 (FIG. 4) from the shaver input circuit, and placing its movable contact MC1 into engagement with its stationary contact S1, thereby placing a shunt or "short circuiting" connection across capacitor C3. This short circuiting connection effectively removes capacitor C3 from the shaver input circuit. With both capacitors thus removed from the input circuit the applied alternating power is applied directly to the input of rectifier VE.

It may also be noted that the capacitors effectively limit the magnitude of the applied alternating voltage supplied to rectifier VE without substantially increasing the power consumption of the appliance.

As changes can be made in the above described construction and many apparently different embodiments of this invention can be made without departing from the scope thereof, it is intended that all matter contained in the above description or shown on the accompanying drawing be interpreted as illustrative only and not in a limiting sense.

What is claimed is:

The electrical power and control mechanism for an electrical appliance comprising: a driving motor having two input terminals; power converting means for converting alternating power to unidirectional power, said converting means having output terminals connected electrically to said motor input terminals for supplying unidirectional power thereto, said converting means also having two input terminals adapted for connection to a source of alternating power; and reactive impedance means electrically interconnected to the input terminals of said converting means and adjustable to limit the magnitude of the voltage component of said alternating power applied to said power converting means to predetermined levels, said adjustable reactive impedance means include a three position manual switch and two capacitors, each of said capacitors having two terminals, said manual switch having two stationary contacts and a movable contact selectively actuatable into engagement with said stationary contacts, a first one of said capacitors being electrically interconnetced between said movable contact and a first one of said stationary contacts, said movable contact being connected electrically to a first input terminal of said power converting means, said other capacitor being electrically interconnected between the other of said stationary contacts and the other input terminal of said power converting means, said switch having a normally open midposition in which said movable contact is disengaged from both said stationary contacts, said switch being adjustable to a second position connecting said movable contact to the other of said stationary contacts placing said other capacitor in shunting relationship across said input terminals of said power converting means, and said switch being actuatable to a third position disconnecting said movable contact from said other stationary contact disconnecting said shunting other capacitor and placing said movable contact into engagement with said first stationary contact connecting a short circuit across said first capacitor.

References Cited by the Examiner

UNITED STATES PATENTS

| | | | |
|---|---|---|---|
| 2,722,645 | 11/1955 | Brown | 310—71 X |
| 2,735,023 | 2/1956 | Kozinski | 318—442 X |
| 3,079,510 | 2/1963 | Hartwig | 318—17 X |
| 3,096,470 | 7/1963 | Kalenian | 318—510 X |
| 3,108,192 | 10/1963 | Reich | 320—2 X |

ORIS L. RADER, *Primary Examiner.*

J. C. BERENZWEIG, *Assistant Examiner.*